Patented May 18, 1943

2,319,734

UNITED STATES PATENT OFFICE 2,319,734

GEOCHEMICAL PROSPECTING

Leo Horvitz, Houston, Tex., assignor to Esme E. Rosaire, Houston, Tex.

No Drawing. Application November 4, 1939, Serial No. 302,853

3 Claims. (Cl. 23—230)

The present invention relates to geochemical prospecting wherein samples of soil are examined for contents indicative of the proximity to buried deposits, particularly petroliferous deposits. This application is a continuation-in-part of my co-pending application Ser. No. 290,201, filed August 15, 1939, and entitled Geochemical prospecting.

It has been long suspected that the adsorptive, absorptive or occlusive power (generally classified herein as sorptive power) of the various soil samples may have some effect on the results obtained. Thus two soil samples, each subjected to the same amount of a gas, say ethane, migrating therethrough might show different amounts of entrained gas due to the different sorptive powers. Therefore, if the sorptive power is known, the data might be adjusted or corrected so that such data would have greater significance relative to the location of the sought deposits.

Accordingly, analysis of various soil samples was made to determine the relative sorptive power. It was found that the particle size is the important factor. Clays, for example, have a much higher sorptive power than sands of gravels. Having determined the sorptive power of the soil, this quantity may be used to adjust the analytical data obtained from the analysis of the soils for gaseous contents.

An object of the present invention is, therefore, to determine the relative sorptivity of various soil samples in order to make corrections in data obtained by analysis of soils for their entrained constituents. This I prefer to do by an analysis for sorptivity of a portion of the same soil sample to be analyzed for entrained constituents.

The preferred method of determining the sorptivity of the soil is by measuring the effective grain size. One way of measuring the effective grain size is to determine the ratio of material having a grain size below an arbitrary value to the material having a grain size above that value. It was found that as a practical matter it is best to select the arbitrary value so that the results obtained will be the ratio of clay to the ratio of sand in the sample. If the weight and volume of the clay and weight and volume of the sand are obtained, an approximate correction for the sorptive power of the soil may be made based on the relative amount of clay and sand.

In determining the ratio of material having a grain size below some arbitrary value to the material having a grain size above that value it is preferred to use the following procedure. A soil sample is agitated in water whereby the smaller particles are maintained in suspension, the larger particles settling out. Decanting the supernatant liquid and fines and successively repeating the suspension and decanting steps until only the coarser particles remain, enables a satisfactory separation. The coarse material is then dried and weighed, and from the weight of the original sample the ratio of clays or fines to sand may be determined.

When the ratio of clay or fines to sand has been determined, as just described, the weight or volume of hydrocarbons in each soil sample is divided by the ratio of clay to sand determined for that sample.

A method of obtaining effective grain size of the particles of the soil is by the use of screening. By using standard screens a dried sample may be separated into fractions within several grain size ranges. By determining the relative amounts of the material within the several grain size ranges a correction factor may be obtained.

Another method of measuring effective grain, size of the particles may be made by determining the actual grain size of the particles. This can be done by the method of E. M. Crowther "A manometric apparatus for the direct determination of summation percentage curves in mechanical analysis" (J. Soc. Chem. Ind. 1927, 46, 105 T—107 T; also First Int. Cong. Soil Sci. (Washington 1927), 1928, 1, pp. 394–398).

After the effective grain size of the samples has been determined the data obtained by the analysis of the soils is adjusted by expressing the hydrocarbon gases contained in the sample in terms of unit area of particles in the sample under analysis. For example, a sample to be analyzed is first treated for the removal therefrom of hydrocarbons. The residual sample is then disintegrated into particles and the particles are screened through a plurality of screens of different sizes so that the particles may be graded as to size. Knowing the weight of the sample and the weight of fractions thereof of different particle size, it is possible to determine the total surface area of the sample. The hydrocarbon content is then divided by this surface area to reduce the significant figure to terms of unit surface area.

While I have disclosed several specific methods of carrying out my invention, other modifications of the present invention will be apparent to a skilled worker in the art, and it is my intention not to be bound by the specific examples disclosed, but to claim the present invention as broadly as the prior art permits.

I claim:

1. In a method of prospecting for petroliferous deposits in which samples of soil are collected in the area to be investigated and are analyzed for a constituent indicative of the presence of oil in a subterranean formation in said area, the step of determining the relative amounts of fine and coarse material in the soil samples, whereby the ratio of these materials may be utilized in the interpretation of the results.

2. In a method of prospecting for petroliferous deposits in which soil samples are collected at spaced points in an area to be explored, are treated for the recovery therefrom of a gas and the gas is analyzed for its content of a constituent significant of the presence of oil in a subterranean formation in the area explored, the step of determining the relative amounts of fine and coarse material in each of the soil samples, whereby this information may be used in the interpretation of the results of the gas analysis.

3. A method according to claim 2 in which the significant constituent of the gases analyzed is a hydrocarbon.

LEO HORVITZ.